(12) United States Patent
Hofer

(10) Patent No.: US 6,497,907 B2
(45) Date of Patent: *Dec. 24, 2002

(54) BAKING DEVICE AND METHOD

(76) Inventor: Wolfgang Hofer, Leonfeldnerstrasse 207, A-4040 Linz (AT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/424,018
(22) PCT Filed: May 14, 1998
(86) PCT No.: PCT/AT98/00127
§ 371 (c)(1),
(2), (4) Date: Nov. 17, 1999
(87) PCT Pub. No.: WO98/52418
PCT Pub. Date: Nov. 26, 1998

(65) Prior Publication Data
US 2001/0051202 A1 Dec. 13, 2001

(30) Foreign Application Priority Data
May 17, 1997 (EP) .............................. 97108093

(51) Int. Cl.$^7$ .............................. A21B 1/24; A21B 1/40
(52) U.S. Cl. .................. 426/233; 426/510; 426/523; 99/330; 99/333; 99/337; 99/343; 99/468; 99/476; 126/20; 126/369
(58) Field of Search .................. 99/330, 333, 337, 99/347, 426, 467, 342–343, 474–475, 468; 426/510, 523, 231, 233, 509; 126/21 A, 369, 20

(56) References Cited

U.S. PATENT DOCUMENTS

| 4,011,805 A | * | 3/1977 | Vegh et al. ..................... 99/467 |
| 4,058,635 A | * | 11/1977 | Durth .......................... 426/509 |
| 4,167,585 A | * | 9/1979 | Caridis et al. ............... 426/233 |
| 4,531,306 A | * | 7/1985 | Erickson ........................ 34/44 |
| 4,698,487 A | * | 10/1987 | Meister ....................... 219/506 |
| 4,770,888 A | | 9/1988 | Loeb |
| 4,839,502 A | * | 6/1989 | Swanson et al. ............. 219/401 |
| 5,075,121 A | * | 12/1991 | Desage et al. ............... 426/233 |
| 5,083,505 A | * | 1/1992 | Kohlstrung et al. .......... 99/331 |
| 5,365,039 A | | 11/1994 | Chaudoir |
| 5,442,994 A | * | 8/1995 | Parker ......................... 99/468 |
| 5,463,940 A | * | 11/1995 | Cataldo ....................... 99/476 |
| 5,595,109 A | | 1/1997 | Shelton |
| 5,660,103 A | * | 8/1997 | Koopman ..................... 99/468 |
| 5,680,810 A | * | 10/1997 | Sham ........................... 99/330 |
| 579,081 A | * | 8/1998 | Carlsson et al. ............. 219/711 |
| 6,035,763 A | * | 3/2000 | Yung ............................ 99/348 |

FOREIGN PATENT DOCUMENTS

| AT | 401 707 | 4/1996 |
| DE | 3804678 A1 | 8/1989 |
| EP | 0 174 681 A2 | 3/1986 |
| EP | 0 508 288 A2 | 10/1992 |
| EP | 0 648 420 A2 | 4/1995 |
| EP | 0 653 900 A1 | 5/1995 |
| FR | 2 501 471 | 9/1982 |

* cited by examiner

Primary Examiner—Keith Hendricks
Assistant Examiner—Drew Becker
(74) Attorney, Agent, or Firm—Alston & Bird LLP

(57) ABSTRACT

The invention relates to a device (1) for producing bakery products (2). It has an oven (4) closed off by a door (5) and a heating device (7) which heats the oven (4). A delivery device (10,31) is also provided for a fluid (11), along with a discharge element (12) arranged in the oven (4), a storage container (22) and a conveyor device (20) for the fluid (11). A sensor (8, 9) is arranged in the oven (4) for detecting at least one actual value for a temperature in the oven (4) and which is connected to a control device (16). The latter is also connected to the heating device (7), the delivery device (10,31) for the fluid (11) and an energy source (21). At least one other sensor (8, 9) is provided in the oven (4) for detecting an actual value of the humidity and is connected, along with a clock timer (30), to the control device (16). The control device (16) is connected to the input units (26, 27) for a desired value for the humidity and/or the temperature, which, as is the case, may depend on a baking or cooking time which can be pre-set by means of the clock timer (30).

10 Claims, 1 Drawing Sheet

BAKING DEVICE AND METHOD

Figure 1:
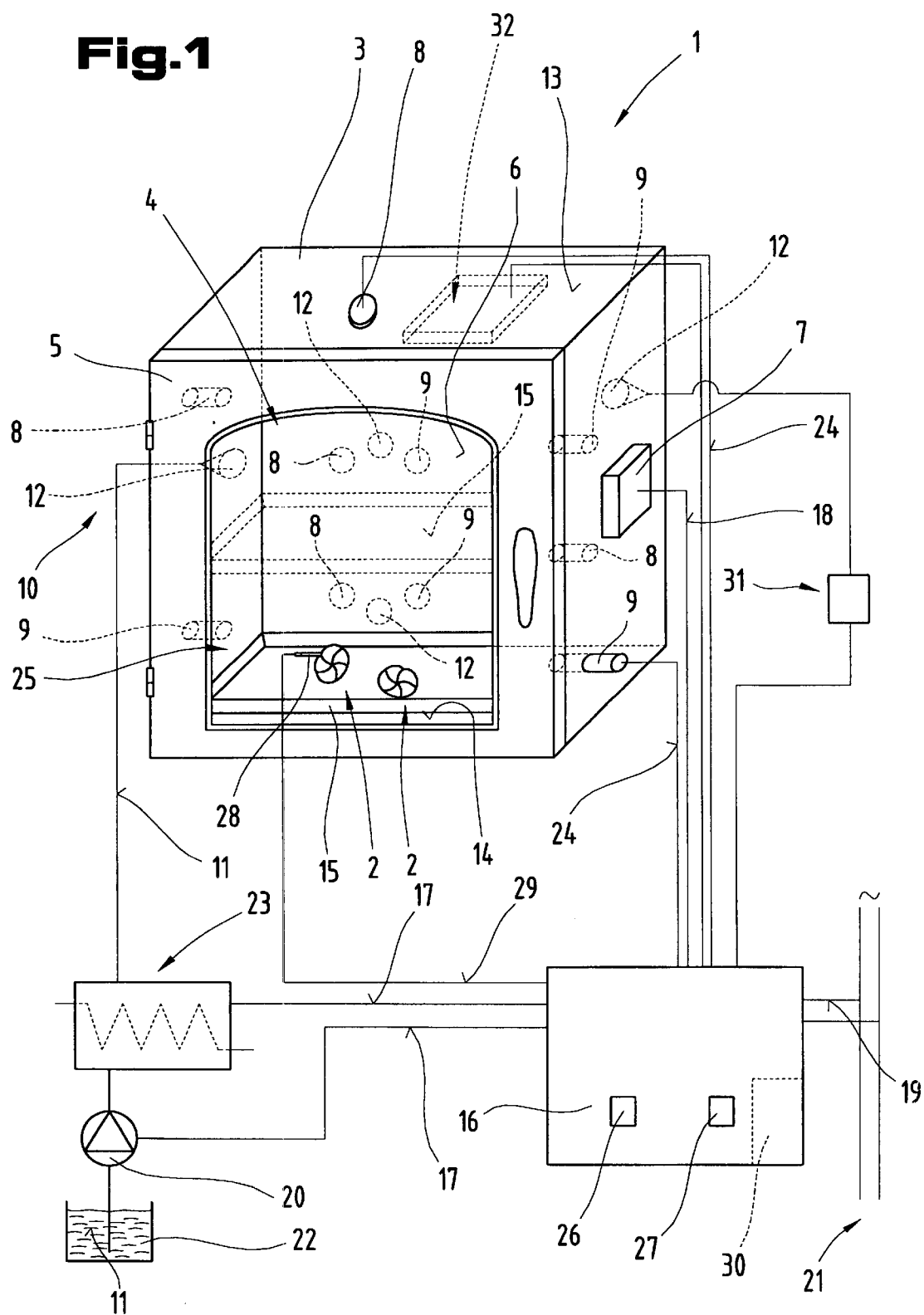

The invention relates to a device for making bakery products and a method of cooking and/or baking foodstuffs or bakery products.

Various devices for making bakery products, in particular for cooking and/or baking foodstuffs or bakery products, and a corresponding method are known. Document AT 401 707 B stipulates the temperatures and humidity to be applied both during preparation of the dough and during what is referred to as the proving time. In addition, the main proving process is interrupted before it is completed. This prevents a skin from forming prematurely on the baked products so that the steam, generated subsequently when baking previously deep-frozen bakery products and occurring at a relatively late point in the baking or cooking process, does not cause the skin to burst in the region of the top surface of the bakery products. All that is said about conditions pertaining to the bakery goods during baking is that when they have been placed on the baking tray, the bakery products should be sprayed with water and then baked using the most possible steam (steaming), which means that both hot air ovens as will as fan-assisted ovens can be used. The disadvantage of this is that it is not possible to delay or prevent the early formation of a skin on the bakery products during final finishing of the same baking process with any degree of reliability.

The objective of this invention is to provide a device of the type outlined above, as well as a method of cooking and/or baking foodstuffs or bakery products by means of which the cooking or baking process can be universally adapted to different conditions.

This objective is achieved by the characterising features of the invention. The advantage gained is that by constantly monitoring a desired and an actual value of the humidity and/or temperature in the oven in relation to the cooking or baking temperature and/or cooking or baking time, it is possible to prevent either excessive drying or too high a humidity at the surface of the bakery products as well as the formation of a skin in the region of the bakery products which is undesirable or occurs too late. Furthermore, the foodstuffs or bakery products are cooked or baked evenly.

This also makes it easy to control steam or other ingredients released from the foodstuffs or bakery products, which means that the finished cooked or bakery products can be improved, namely the appearance of the foodstuffs or bakery products as well as their conservation and freshness, in particular their crispiness, which can be maintained for a longer period. Another advantage of this solution resides in the fact that the respective humidity and the respective temperature in the oven in which the foodstuffs or bakery products are placed remains constant without any additional intervention, e.g. an extra measuring process.

By means of another embodiment, the actual value of the humidity and/or temperature can be taken into account overall during the subsequent cooking or baking process, which means that it is also possible to adapt changes in temperature and the timing of the cooking or baking process so that the quality produced represents an optimum between the desired cooking or baking result and the cooking or baking time.

Another embodiment offers an advantage since it allows a sensitive adjustment of the temperature in the oven. Accordingly, the difference between the desired and actual value or variance from the desired value relating to the temperature and/or humidity content can be kept low.

Another embodiment is such that the humidity value can be rapidly adapted to different production stages and a cooking or baking process optimised.

There are also advantages to be had from an embodiment in which the entire cooking or baking process can be monitored. This means above all that the entire cooking or baking process can be continuously and constantly monitored so that, depending on the cooking or baking time and depending on the sensitivity of the foodstuff to be cooked or the products to be baked, the timing between the individual points at which the actual value of the humidity and/or temperature and/or cooking time and/or difference is detected can be universally adapted to suit different applications.

With a further embodiment, it is also possible to detect the setting of the temperature and/or the humidity temperature and/or the humidity and the difference between them and a related desired value depending on the duration of the cooking or baking process.

The design of the control device enables sensitive monitoring but also allows the cooking or baking process to be regulated.

The options for selecting how the fluid is introduced have an advantage in that they allow adaptation to the desired change in humidity in the oven.

In accordance with yet another embodiment, the invention provides a simple means of producing an even humidity and/or temperature across the entire volume of the oven.

The objective of the invention is also achieved by constantly monitoring the actual values of the humidity and temperature in the oven and by constantly comparing them in order to establish any variance from the desired values. In this manner the cooking or baking process can be universally adapted to produce a favorable finished result from the cooking or baking process.

The invention can also offer advantages since monitoring the difference between the desired and actual values means that the variance of the actual value from the desired value can be kept to a minimum, so that external conditions such as fluctuations in the input of the power supply to the heating device as well as different quantities loaded in the oven for example, and of course differences in the humidity and/or temperature of the foodstuffs or bakery products being cooked or baked, can be taken into account in a simple, fully automated manner, without the need for extra work processes.

The invention will be described in more detail in relation to an embodiment illustrated in the drawing.

This drawing:

FIG. 1 is a very simplified, schematic illustration of a device as proposed by the invention for producing bakery products, seen from a front view, showing the associated control device in a block diagram.

FIG. 1 illustrates a device 1 for producing schematically illustrated bakery products 2, e.g. bread rolls, croissants and similar. An oven 4 arranged in a housing 3 is accessible from a front face by means of a door 5, the door 5 being fitted with a transparent glass pane 6, making it possible to keep an eye on the cooking or baking process.

The oven 4 co-operates with a heating device 7 which heats the oven 4. The heating device 7 may be of any design having any feature known from the prior art and may be operated by any medium such as gas, electricity, oil or solid fuels. Clearly, other heat-generating devices may also be used such as micro-waves, high-frequency systems, etc., and the energy supply may also be provided by feeding in hot air.

Arranged in the interior of the oven 4 is at least one sensor 8 for detecting an actual value for the temperature and at least one other sensor 9 for detecting the actual value of the humidity in the oven 4. Also provided in the oven 4 is a delivery device 10 for a fluid 11 in order to regulate the humidity and/or temperature in the oven 4. This delivery device 10 has at least one discharge element 12 in the oven 4 for the fluid 11.

Clearly, several discharge elements 12 may also be provided and these may be arranged distributed around an interior chamber or an interior surface of the oven 4 in any layout.

Amongst other things, the fluid 11, particularly if supplied in liquid form, may also be fed into a catchment container in the interior of the oven 4, from where it can be emitted in a gaseous or vapor state as a result of the heat prevailing in the oven 4.

There may be an advantage to be had if the discharge elements 12, which may be spray nozzles, atomiser nozzles and similar, are evenly distributed across a cover plate 13 of the oven 4 because, as the fluid 11 flows in, regardless of whether in liquid, gaseous or vapor state, this steam will be heavier due to the difference in temperature of the steam relative to the air temperature in the oven 4 and will therefore move down in the direction of a floor 14 of the oven 4, thus being evenly distributed across virtually the entire volume of the oven 4.

However, if several baking trays 15 holding bakery products 2 are placed in an oven 4, it may be of advantage to provide evenly distributed discharge elements 12 for the fluid 11 around the periphery of the oven 4, at least around the side walls and rear wall thereof, respectively in the region between two baking trays 15, so that moisture can be duly applied to the bakery products in each position, allowing the moisture input and stabilisation to be finely controlled.

This being the case, it may also be advantageous to arrange sensors 8 and 9 for the actual temperature and humidity values in the intermediate space so that a control device 16 can be specifically designed—as will be explained in more detail below—to determine the desired values for temperature and/or humidity individually for each baking tray 15.

This control device 16 is connected to a conveyor device 20 for the fluid 11, the delivery device 10, the heating device 7 and an energy source 21 by means of lines 17, 18, 19.

The conveyor device 20 may draw off the fluid 11 from a storage container 22 or from a system of pipework or the fluid may be drawn directly through a valve of the piping system operated by the control device 16.

It is also possible to provide, between the conveyor device 20 and the discharge element 12 or at any other random point, a steam generator 23 so that the fluid 11 can be converted from a liquid to a vapor state.

Clearly, however, in addition to the discharge elements 12 for the fluid 11 in liquid state, it would also be possible to provide elements for discharging the fluid 11 in a vapor state, in which case the conveyor device 20 and—as shown by an additional line 17—the steam generator 23 would also be operated by the control device 16 in order to apply the fluid 11 in different states, for example by applying steam or water vapor or micro-fine droplets and/or at different points of the oven 4.

Sensors 8 for detecting temperatures in the oven 4 and sensors 9 for detecting humidity in the oven 4 are connected to the control device 16 by means of lines 24.

As indicated by broken lines, several such sensors 8, 9 and/or sensors 9 can be provided and the person skilled in the art may select the layout and distribution of these sensors 8, 9 on the basis of his specialist knowledge of the field, these not being tied or restricted to the particular embodiment illustrated here. As denoted schematically by broken lines, sensors 8, 9 of this type may also be arranged in an intermediate space 25 between two baking trays 15, e.g. around the periphery or a part-circumference of the oven 4.

Furthermore, the control device 16 may be provided with input units 26, 27 for entering a desired value for humidity or temperature in the oven 4. Clearly, the input units 26, 27 are illustrated here on a functional basis only and any other technical means, e.g. keyboards, may be used with the requisite software units or computers and personal computers for and in conjunction with the control device 16.

The desired values entered for humidity and temperature may depend on the length of the cooking or baking time, such as a defined temperature for specific humidity values or vice versa, and the temperature can be set on the basis of the cooking or baking time elapsed in conjunction with the humidity, or the elapsed baking and cooking time can be predetermined by correlating the temperature with the desired humidity value.

Any cooking and baking process can be carried out with the device 1 and in the oven 4 and it is therefore possible to process dough portions for bakery products 2, e.g. immediately after the main fermentation or what is referred to as the proving time, in the oven 4 or, accordingly, deep-frozen or pre-frozen bakery products, which have been previously frozen as dough portions or already part-baked and frozen.

When using pre-frozen or frozen dough portions, for example, it can be of advantage to insert a schematically illustrated probe 28 in the bakery products 2, which can also be connected to the control device 16 by means of a line 29 in order to detect the temperature and/or moisture content of the bakery products 2 on a continuous basis, and these detected actual values can then be used for computing the desired values for temperature and humidity in the oven 4.

The method of cooking or baking foodstuffs or bakery products 2 may proceed as follows:

The bakery products 2 are laid out on a baking tray 15, having been pre-processed or not depending on the production process, e.g. directly after the proving time or in a frozen or cooled state. After opening the door 5, this baking tray 15 is placed in the oven 4, in particular pushed along matching guide tracks. Depending on the cooking or baking process to be carried out, the oven 4 may have been pre-heated to a desired temperature, for example, and the air in the interior of the oven 4 set to a requisite desired value for air humidity. The oven 4 may be preheated and the corresponding air humidity in the interior of the oven 4 pre-selected via the control device 16, these values being stored in an operating programmed, which may be of any one of the most varied of types known from the prior art, in the control device 16.

Depending on the set or selected cooking or baking programmed, the actual value of the temperature and/or the humidity in the oven 4 is constantly monitored by the sensors 8, 9 and these data are either continuously applied to the control device 16, e.g. in real time or intermittently at specific time intervals, or respectively after a certain time of the cooking duration has elapsed, or alternatively when certain pre-selected temperature levels have been reached. Clearly, the timing used to detect the actual value for the air humidity and the actual value for the temperature can be phased relative to one another.

In order to monitor the baking time, the control device 16 has a clock timer 30. This may also be used to determine sampling of the actual values, which will be defined beforehand depending on the temperature and the cooking or baking time on the basis of the desired values set for temperature and humidity via the input units 26, 27. These definitions and desired values may clearly also be integrated in a corresponding computer programmed or may be pre-defined in memory units - depending on the programmed run - and continuously compared with the actual values for temperature and humidity.

If the control device 16 ascertains that the actual value for humidity is at variance with the desired value, the actual value for humidity will be reduced to the desired value by feeding in dry air or drawing off moisture, for example, and, if the humidity in the oven 4 is too low, fluid 11 in liquid, gaseous or vapor form will be fed in to increase the moisture content until the actual value matches the desired value again.

In order simultaneously to keep the temperature constant, reduce or lower the temperature in the oven 4, the fluid 11 fed in may be in the most varied of states, e.g. as a liquid at the most varied of temperatures, e.g. cooled as steam or as hot steam or over-heated steam, in order to maintain, lower or raise the temperature simultaneously with the increase in humidity.

Simultaneously or regardless thereof, the temperature can be monitored accordingly and if there are any variances in the actual value from the desired value, either cool, cooled or deepfrozen air can be fed in via the delivery device 10, 31 or via a separate delivery device 31, in order to reduce the temperature and, for example, to allow hot steam or wet steam to circulate so as to raise the temperature abruptly—as a supplement to the heating device 7 provided anyway. The temperature may be regulated by means of the delivery devices 10, 31 or also by exchanging the air in the interior of the oven 4 or by an exchange of heat. In addition, by using a regulating mechanism to adapt to the desired value, it is possible to set this as standard for the entire oven 4 or to provide appropriate units and means alternately for individual baking trays 15 or individual regions of the oven 4 in order to adapt the temperature to the actual values in certain regions.

For example, in order to adapt or maintain the desired value of the temperature and/or humidity, it is possible to use what are referred to as misters which distribute vapor, hot or wet steam in the oven 4.

One of the advantages of the proposed method resides in the fact that by using this control device in the manner described, the oven 4 can be used universally for different cooking and baking purposes and other processes such as baking, roasting, steaming, thawing and similar. Due to the option of fully automated operation or "self-learning operation", there is no longer any need to take account of the temperature and/or humidity or the temperature of the moisture and the quantity when the oven 4 is loaded. For example, the actual values for the temperature and/or moisture content of the foodstuffs or bakery products 2 can also be detected with one or more probes 28 and there is then no need to take account of different cooking quantities, temperatures and moisture levels in the foodstuffs or bakery products 2 in the oven 4 to regulate the control device 16.

As a result of this automatic regulation system, the control device 16 produces an optimum cooking and/or baking process by selecting the humidity and/or temperature - on the basis of the set actual values - in which case, in the preferred approach, the difference between the desired and actual value for temperature and/or humidity of the cooking or baking process is constantly and continuously detected when different quantities or volumes of foodstuffs and/or bakery products 2 are inserted and preferably above all if these are of different moisture contents and/or temperatures.

Accordingly, an optimum baking and cooking process can be produced irrespective of whether operating personnel are to hand, even under different operating conditions, and can be so without the disadvantage of setting errors which might occur with manual input and without the need to load individually staggered programmes specifically set up to process different conceivable quantities and/or temperatures of bakery products and/or moisture content of the bakery products. This reduces setting requirements for the programmes and, accordingly, maintenance time whilst ruling out operator errors.

Consequently, the cooking or baking programmes can be set up to maximize capacity of the oven 4 and the programmed run can be optimised on a fully automated basis— in terms of temperature and humidity—when processing smaller quantities in the oven 4 so that the cooking or baking result will be constant regardless of the quantity in the oven.

Clearly, the device and method described can also be used for all other processes such as roasting, steaming, stewing and/or thawing foodstuffs or bakery products 2.

The device and method described can be supplemented by providing the device 1 with a microwave generator 32, thereby enabling the oven and the foodstuffs or bakery products contained in it to be heated by micro-waving. Particularly when processing frozen foodstuffs or bakery products 2, this will make it possible at the start of processing, i.e. heating, simultaneously and/or in advance and/or after the heat has been allowed to act on the foodstuffs or bakery products 2 for a specific time, to heat the interior of the foodstuffs or bakery products 2 by means of the microwave action.

By heating the central region, the water vapor which occurs can be released more easily through the surface without removing the surface layers, allowing the central regions of the foodstuffs and bakery products 2 to expand unhampered so that the final cooked process or final baking process will be uniform throughout the entire volume of the foodstuffs or bakery products 2.

Within the context of the invention, it would clearly also be possible to apply the method proposed by the invention in conjunction with other methods known from the prior art.

List of Reference Numerals

1 Device
2 Bakery product
3 Housing
4 Oven
5 Door
6 Glass pane
7 Heating device
8 Sensor
9 Sensor
10 Delivery device
11 Fluid
12 Discharge element
13 Cover plate
14 Floor
15 Baking tray
16 Control device
17 Line
18 Line
19 Line
20 Conveyor device
21 Energy source
22 Storage container
23 Steam generator
24 Line 25 Intermediate space
26 Input unit
27 Input unit
28 Probe
29 Line
30 Clock timer
31 Delivery device
32 Microwave generator

What is claimed is:

1. A device for baking, comprising:

an oven having a heating device operable to heat the oven;

at least one temperature sensor operable to detect an actual temperature within an interior of the oven;

at least one humidity sensor operable to detect an actual humidity within the interior of the oven;

at least one discharge device structured and arranged for discharging a fluid into the interior of the oven;

a delivery device for supplying fluid to the at least one discharge device so that the fluid is discharge by the at least one discharge device into the interior of the oven wherein the delivery includes first and second delivery devices respectively operable to provide water in two different physical states and to supply the water to the discharge device, and wherein the control device is operable to select which of the first and second delivery devices supplies water to the discharge device;

an input device operable to allow a user to input a set-point temperature and a set-point humidity that the user desires to be maintained within the interior of the oven; and a control device connected to the input device, to the heating device, to the at least one temperature sensor, to the at least one humidity sensor, and to the delivery device, the control device being operable to regulate operation of both the heating device and the delivery device so as to continually drive the actual temperature and actual humidity measured by the sensors within the oven toward the set-point temperature and set-point humidity;

wherein the delivery device is responsive to the control device supply moisture through the at least one discharge device into the oven for increasing the humidity in the oven, and is responsive to the control device to supply dry air through the at least one discharge device into the oven for decreasing the humidity in the oven.

2. Device according to claim 1, wherein if the set-point temperature in the oven is exceeded, the delivery device is activated by means of the control device so as to deliver at least one of fluid and cool air to the oven.

3. Device according to claim 1, wherein the control device detects the difference between the set-point and actual values of the humidity and temperature in the oven on an intermittent basis.

4. Device according to claim 1, wherein at least one of the set-point temperature and the set-point humidity is determined by the control device in accordance with a predetermined value for the baking duration.

5. Device according to claim 1, wherein the control device has a programmable computer, which has at least one memory unit for storing at least one of the set-point humidity and the set-point temperature and a baking time.

6. Device according to claim 1, wherein the delivery device and discharge device are operable to introduce the fluid into the oven at above atmospheric pressure.

7. Device according to claim 1, wherein the discharge device includes discharge elements for the fluid that are arranged distributed across an interior surface of the oven.

8. A method for baking products, comprising:

placing the products in an oven heated to a baking temperature by a heating device;

detecting an actual temperature within an interior of the oven;

detecting an actual humidity within the interior of the oven;

detecting at least one of a temperature and a moisture content of the products in the oven during baking;

predetermining a set-point temperature and a set-point humidity that are desired to be maintained within the interior of the oven, the set-point temperature and set-point humidity being based on said at least one of the temperature and moisture content of the products;

supplying water into the oven when the actual humidity is lower than the set-point humidity; and performing at least one of supplying dry air into and withdrawing moisture from the oven when the actual humidity is greater than the set-point humidity.

9. Method according to claim 8, wherein the set-point temperature and set-point humidity are determined based on a predetermined time duration for cooking.

10. Method according to claim 8, wherein the set-point humidity is determined as a function of the moisture content of the products.

* * * * *

UNITED STATES PATENT AND TRADEMARK OFFICE
CERTIFICATE OF CORRECTION

PATENT NO.    : 6,497,907 B2
DATED         : December 24, 2002
INVENTOR(S)   : Hofer It is certified that error appears in the above-identified patent and that said Letters Patent is hereby corrected as shown below:

<u>Title page,</u>
Item [56], References Cited, U.S. PATENT DOCUMENTS, "579,081" should read -- 5,796,081 --.

<u>Column 7,</u>
Line 20, "discharge" should read -- discharged --;
Line 22, after "delivery", first occurrence, insert -- device --;
Line 42, after "device" insert -- to --.

Signed and Sealed this

Eighteenth Day of March, 2003

JAMES E. ROGAN
*Director of the United States Patent and Trademark Office*